United States Patent
Yang et al.

(10) Patent No.: US 8,914,160 B2
(45) Date of Patent: Dec. 16, 2014

(54) DEMAND RESPONSE METHOD AND DEMAND RESPONSE SYSTEM

(75) Inventors: Jang Beom Yang, Sinchang-dong (KR); Jae Min Lim, Anyang-si (KR); Seong Wook Jeong, Singa-dong (KR); Sun Il Jin, Yongin-si (KR); Seong Oh Kwak, Gwangju-si (KR); Seong Chan Gim, Gwangju-si (KR); Young Jin Baek, Changwon-si (KR); Hyun Ki Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 633 days.

(21) Appl. No.: 13/082,875

(22) Filed: Apr. 8, 2011

(65) Prior Publication Data

US 2011/0251731 A1    Oct. 13, 2011

(30) Foreign Application Priority Data

Apr. 12, 2010  (KR) .................. 10-2010-0033084
Mar. 15, 2011  (KR) .................. 10-2011-0022678

(51) Int. Cl.
  *G05D 17/00* (2006.01)
  *G05B 15/00* (2006.01)
  *H02J 3/14* (2006.01)

(52) U.S. Cl.
  CPC  *H02J 3/14* (2013.01); *Y04S 20/222* (2013.01); *Y02B 70/3225* (2013.01); *Y04S 20/242* (2013.01); *Y02B 70/3266* (2013.01); *H02J 2003/143* (2013.01)
  USPC ........................... 700/296; 700/275; 700/295

(58) Field of Classification Search
  None
  See application file for complete search history.

(56) References Cited

U.S. PATENT DOCUMENTS

| | | | | |
|---|---|---|---|---|
| 3,659,114 A * | 4/1972 | Polenz et al. | ................... | 307/52 |
| 4,090,062 A * | 5/1978 | Phillips et al. | ................ | 219/486 |
| 4,223,379 A * | 9/1980 | Simcoe | .......... | 700/15 |
| 4,324,987 A * | 4/1982 | Sullivan et al. | ................. | 307/35 |
| 4,419,589 A * | 12/1983 | Ross | ............... | 307/39 |
| 4,476,398 A * | 10/1984 | Hallam | .......... | 307/39 |
| 5,289,362 A * | 2/1994 | Liebl et al. | ...................... | 700/22 |
| 5,410,471 A * | 4/1995 | Alyfuku et al. | ............... | 600/300 |
| 5,539,391 A * | 7/1996 | Yuen | .......................... | 340/12.53 |
| 5,572,438 A * | 11/1996 | Ehlers et al. | .................. | 700/295 |
| 5,625,236 A * | 4/1997 | Lefebvre et al. | ................. | 307/41 |
| 5,642,101 A * | 6/1997 | Stirk et al. | .................... | 340/3.51 |
| 5,886,417 A * | 3/1999 | Oka et al. | ........................ | 290/52 |
| 5,973,497 A * | 10/1999 | Bergk et al. | ................... | 324/428 |
| 6,956,461 B2 * | 10/2005 | Yoon et al. | ................. | 340/12.52 |
| 8,094,236 B2 * | 1/2012 | Tanaka et al. | ................. | 348/553 |

(Continued)

FOREIGN PATENT DOCUMENTS

EP    0913905 A2    5/1999

OTHER PUBLICATIONS

Extended European Search Report mailed Mar. 11, 2014 in related European Application No. 11161450.9, 9 pages.

*Primary Examiner* — Kavita Padmanabhan
*Assistant Examiner* — Thomas Stevens
(74) *Attorney, Agent, or Firm* — Staas & Halsey LLP

(57) ABSTRACT

A demand response (DR) method or a demand response (DR) system determines priority of each household appliance in response to a quality status of each household appliance, and variably controls a DR level of each household appliance according to the priority of each household appliance, to guarantee the quality of the household appliance and minimize power consumption.

24 Claims, 13 Drawing Sheets

(56) References Cited

U.S. PATENT DOCUMENTS

| | | | |
|---|---|---|---|
| 8,095,233 B1* | 1/2012 | Shankar et al. | 700/148 |
| 8,234,017 B2* | 7/2012 | Ahn | 700/295 |
| 8,600,562 B2* | 12/2013 | Oswald | 700/278 |
| 8,615,332 B2* | 12/2013 | Heilman et al. | 700/295 |
| 8,639,390 B2* | 1/2014 | Tamarkin et al. | 700/286 |
| 8,674,816 B2* | 3/2014 | Trundle et al. | 340/12.53 |
| 8,793,029 B2* | 7/2014 | Fausak et al. | 700/297 |
| 2001/0030468 A1 | 10/2001 | Anderson et al. | |
| 2002/0004915 A1* | 1/2002 | Fung | 713/320 |
| 2002/0189466 A1* | 12/2002 | Decesari et al. | 99/331 |
| 2003/0085795 A1* | 5/2003 | An | 340/3.1 |
| 2003/0097850 A1* | 5/2003 | Chang et al. | 62/156 |
| 2003/0216818 A1* | 11/2003 | Damrath et al. | 700/22 |
| 2003/0225483 A1* | 12/2003 | Santinato et al. | 700/295 |
| 2003/0233201 A1* | 12/2003 | Horst et al. | 702/62 |
| 2006/0248359 A1* | 11/2006 | Fung | 713/300 |
| 2007/0250184 A1* | 10/2007 | Arita et al. | 700/28 |
| 2008/0167756 A1* | 7/2008 | Golden et al. | 700/297 |
| 2009/0018706 A1* | 1/2009 | Wittner | 700/295 |
| 2009/0064697 A1* | 3/2009 | Kondo et al. | 62/271 |
| 2009/0198384 A1* | 8/2009 | Ahn | 700/292 |
| 2009/0228151 A1* | 9/2009 | Wang et al. | 700/278 |
| 2009/0235104 A1* | 9/2009 | Fung | 713/324 |
| 2010/0070091 A1* | 3/2010 | Watson et al. | 700/278 |
| 2010/0082176 A1* | 4/2010 | Chang | 700/295 |
| 2011/0046805 A1* | 2/2011 | Bedros et al. | 700/291 |
| 2011/0202198 A1* | 8/2011 | Venkatakrishnan et al. | 700/296 |
| 2011/0270456 A1* | 11/2011 | Kouda et al. | 700/292 |
| 2012/0017628 A1* | 1/2012 | Okabe et al. | 62/373 |
| 2012/0017630 A1* | 1/2012 | Okabe et al. | 62/407 |

* cited by examiner

FIG. 8

| HOUSEHOLD APPLIANCE | QUALITY FACTOR | PRIORITY |
|---|---|---|
| REFRIGERATOR | 10 | 1 |
| WASHING MACHINE | 70 | 3 |
| AIR-CONDITIONER | 30 | 2 |
| STOVE (COOK TOP) | 80 | 4 |
| TV | 90 | 5 |

DEMAND RESPONSE METHOD AND DEMAND RESPONSE SYSTEM

CROSS-REFERENCE TO RELATED APPLICATIONS

This application claims the benefit of Korean Patent Applications Nos. 2010-0033084 filed on 12 Apr. 2010, and 2011-0022678 filed on 15 Mar. 2011 in the Korean Intellectual Property Office, the disclosures of which are incorporated herein by reference.

BACKGROUND

1. Field

Embodiments relate to a demand response method for reducing power consumption during peak power rates so as to reduce electricity bills, and a system for the same.

2. Description of the Related Art

Generally, it is necessary for a power system to balance demand and supply. This requirement of the power system is important to rational utilization of limited energy resources.

For the aforementioned purposes, demand management is a focus of attention, and a great deal of research is focused upon development of demand management formats for demand response (DR).

Demand response (DR) is a system for intelligently managing energy consumption depending upon variation in power rates. That is, demand response (DR) means the adjustment of power consumption in response to power rates so as to reduce electricity bills. As a result, power consumption during peak rate periods can be greatly reduced. Consumers can reduce power consumption during a specific time interval of high power rates even if the consumers are inconvenienced during the specific time interval. For example, the consumer may temporarily stop an air-conditioner so as to reduce power consumption when power rates are high.

Recently, many developers are conducting intensive research into an improved demand response (DR) system which changes a DR level predetermined to each household appliance to differentially limit functions of household appliances in response to power rate level information, thereby adjusting power consumption of each household appliance. In more detail, the improved DR system increases the DR level in proportion to power rates so as to further limit functions of the household appliances, thereby reducing power consumption. The DR system reduces power consumption instead of reducing a quality of household appliance, resulting in economization of power rates.

However, the conventional DR system changes a DR level of the household appliance in response to power rates without considering the quality of the household appliance. That is, the conventional DR system increases the DR level when power rates are high and reduces the DR level when power rates are low. As a result, the quality of the household appliance may be deteriorated.

SUMMARY

Therefore, it is an aspect of the present embodiments to provide a demand response method which determines priorities of respective household appliances in response to household appliance quality in such a manner that the quality of the household appliance can be guaranteed within an allowable quality-guarantee range and at the same time power consumption can be minimized, and changes a DR level of each household appliance in response to the determined priority.

Additional aspects of the embodiments will be set forth in part in the description which follows and, in part, will be obvious from the description, or may be learned by practice of the invention.

In accordance with one aspect of the present embodiments, a demand response (DR) method includes recognizing a demand response level established in each household appliance so as to limit a function of each household appliance; determining a quality status of the recognized household appliance; establishing priority information for each household appliance in response to each recognized quality status; determining, if the demand response level established in the household appliance needs to be changed, a household appliance having a demand response level to be changed according to the priority information and the demand response level of each household appliance; and changing a demand response level established in the determined household appliance.

The establishment of the priority information may include establishing priority information of each household appliance on the basis of not only the quality status of each household appliance but also at least one of an average operation time or power consumption of each household appliance.

The establishment of the priority information may include setting priority information of a household appliance having a long average operation time or high power consumption to be higher than that of another household appliance having a short average operation time or low power consumption.

The establishment of the priority information may include receiving information about the quality status of each household appliance from a user, and at the same time receiving information indicating whether an item used for priority of each household appliance is either of the average operation time and the power consumption or both the average operation time and the power consumption.

The establishment of the priority information may include increasing priority in inverse proportion to the quality status.

The determination of the household appliance may include recognizing a current power rate, comparing the recognized power rate with a predetermined power rate, searching for one household appliance having the lowest priority from among low-DR-level household appliances if the current power rate is higher than the predetermined power rate, and determining the searched household appliance to be a household appliance having a demand response level to be changed.

The change of the demand response level may include increasing a demand response level established in the determined household appliance by one step so as to further limit a function of the determined household appliance.

The determination of the household appliance may include recognizing a current power rate, comparing the recognized power rate with a predetermined power rate, searching for one household appliance having the highest priority from among high-DR-level household appliances if the current power rate is lower than the predetermined power rate, and determining the searched household appliance to be a household appliance having a demand response level to be changed.

The change of the demand response level may include reducing a demand response level established in the determined household appliance by one step so as to partially release a limited function of the determined household appliance.

The DR method may further include determining whether the quality status of each household appliance is less than a predetermined level, and changing, if there is a specific household appliance having the quality status of less than the predetermined level, a demand response level of the specific household appliance to a value of a normal operation level.

The determination of the quality status may include receiving a quality factor indicating performance of the household appliance, and determining a quality status of the household appliance in response to the received quality factor.

In accordance with another aspect of the present embodiments, a demand response (DR) system includes a receiving unit to receive a quality factor of a plurality of household appliances; a quality decision unit to determine a quality status of each household appliance in response to the received quality factor of each household appliance; a priority setup unit to establish priority information of each household appliance on the basis of the determined quality status of each household appliance; and a controller to determine, if the demand response level established in the household appliance needs to be changed so as to limit a function of each household appliance, a household appliance having a demand response level to be changed according to priority information and a current demand response level of each household appliance, and change a demand response level established in the determined household appliance.

The priority setup unit may establish priority information of each household appliance on the basis of not only the quality status of each household appliance but also at least one of an average operation time or power consumption of each household appliance.

The priority setup unit may include establishing priority information of a household appliance having any of a low quality status, a long average operation time or high power consumption to be higher than that of another household appliance having any of a high quality status, a short average operation time or low power consumption.

The controller may determine whether the quality status of each household appliance is less than a predetermined level, and change, if there is a specific household appliance having the quality status of less than the predetermined level, a demand response level of the specific household appliance to a value of a normal operation level.

The controller may recognize a current power rate, compares the recognized power rate with a predetermined power rate, search for one household appliance having the lowest priority from among low-DR-level household appliances if the current power rate is higher than the predetermined power rate, determine the searched household appliance to be a household appliance having a demand response level to be changed, and increase a demand response level of the determined household appliance by one step.

The controller may recognize a current power rate, compare the recognized power rate with a predetermined power rate, search for one household appliance having the highest priority from among high-DR-level household appliances if the current power rate is lower than the predetermined power rate, determine the searched household appliance to be a household appliance having a demand response level to be changed, and reduce a demand response level of the determined household appliance by one step so as to partially release a limited function of the determined household appliance.

In accordance with another aspect of the present embodiments, a demand response (DR) method includes establishing a demand response level to limit a function of a household appliance; determining a quality status of the household appliance in which the demand response level is established; determining a changeable demand response level range of the household appliance in response to the determined quality status; and changing, if the demand response level established in the household appliance needs to be changed, the demand response level established in the household appliance on the basis of the determined demand response level range.

The determination of the demand response level range may include reducing the changeable demand response level range in proportion to the lowered quality status.

In accordance with another aspect of the present embodiments, a demand response (DR) method includes operating a plurality of household appliances at an initial demand response level; determining a quality status of each household appliance being operated at the initial demand response level; establishing priority information of each household appliance in response to the determined quality status; recognizing a current power rate of each household appliance; comparing the recognized power rate with a predetermined power rate; searching for one household appliance having the highest priority from among high-DR-level household appliances if the current power rate is lower than the predetermined power rate, determining the household appliance to be a household appliance having a demand response level to be changed, searching for one household appliance having the lowest priority from among low-DR-level household appliances if the current power rate is higher than the predetermined power rate, and determining the household appliance to be a household appliance having a demand response level to be changed; and reducing, if the household appliance having the demand response level to be changed is a household appliance having the highest priority from among high-DR-level household appliances, a demand response level of the determined household appliance so as to partially release the demand response level, and increasing, if the household appliance having the demand response level to be changed is a household appliance having the lowest priority from among low-DR-level household appliances, a demand response level of the determined household appliance so as to further limit a function of the determined household appliance.

BRIEF DESCRIPTION OF THE DRAWINGS

These and/or other aspects of the embodiments will become apparent and more readily appreciated from the following description of the embodiments, taken in conjunction with the accompanying drawings of which:

FIG. 8 is a table showing priorities depending on quality factors of individual household appliances for use in a DR system according to an embodiment.

DETAILED DESCRIPTION

Figure 1:
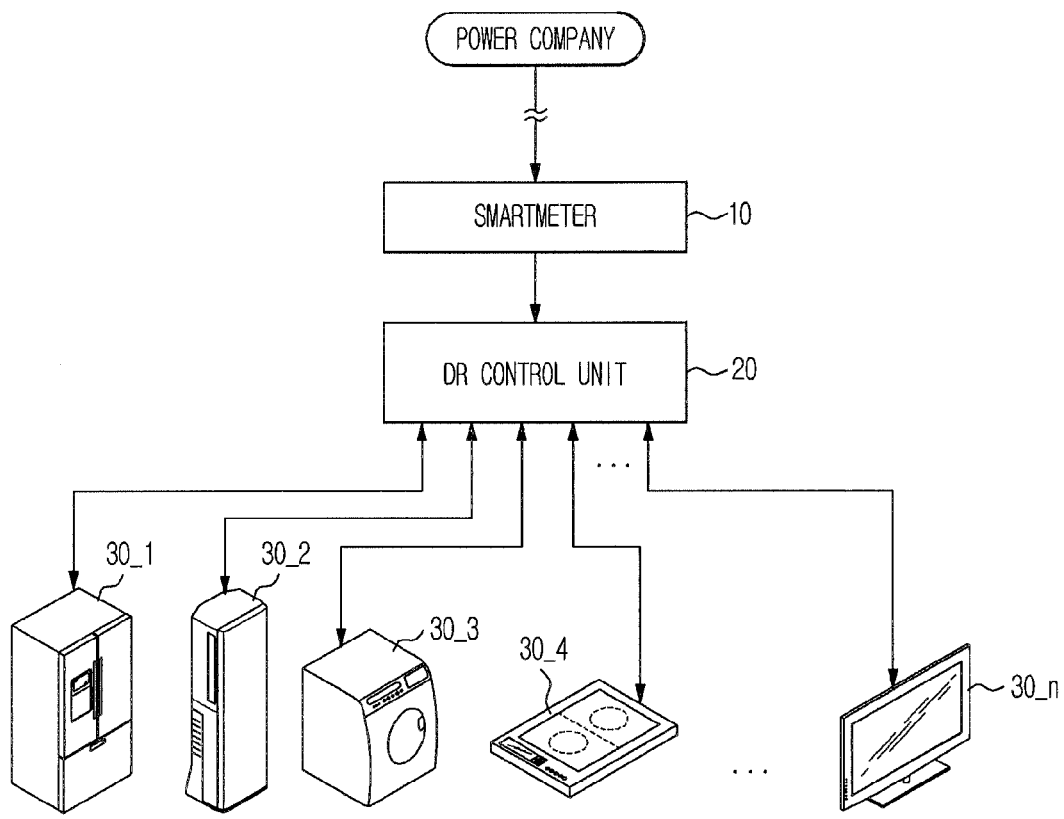
FIG. 1 is a configuration diagram illustrating a demand response (DR) system according to an embodiment.

Reference will now be made in detail to the embodiments of the present invention, examples of which are illustrated in the accompanying drawings, wherein like reference numerals refer to like elements throughout.

FIG. 1 is a configuration diagram illustrating a demand response (DR) system according to an embodiment.

Referring to FIG. 1, the DR system includes a smartmeter 10 installed in a home to transmit and receive information to and from a power company; a DR control unit 20 to receive information about electric demand or electric charges from the smartmeter 10; and respective household appliances 30_1 to 30_*n* connected to the DR control unit 20 directly or over a network.

Each of the household appliances (30_1~30_*n*) performs a desired function using power received through a power line.

The household appliance (30_1~30_*n*) may include all kinds of electric household appliances, for example, a refrigerator, an air-conditioner, a washing machine, a cook top, a television, etc.

Figure 2:
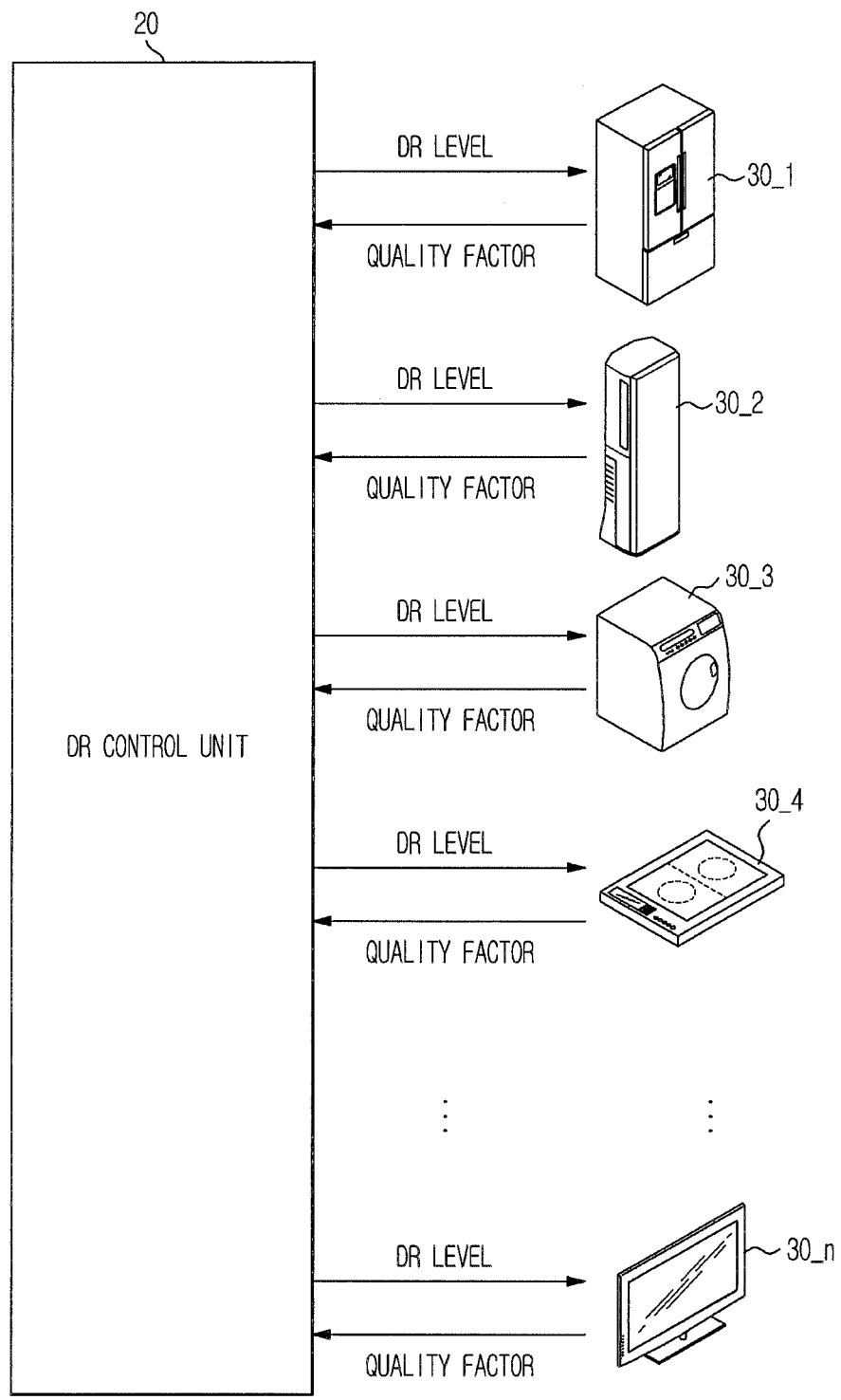
FIG. 2 is a block diagram illustrating a system for controlling a DR controller shown in FIG. 1 to control a DR level in response to a quality factor of each household appliance according to an embodiment.

The household appliance (30_1~30_*n*) transmits quality information as in a quality factor of each household appliance (30_1~30_*n*) to the DR control unit 20 (See FIG. 2).

The DR control unit 20 receives information about electric demand or power rates, and determines a DR level on the basis of the received information. The DR control unit 20 transmits the determined information to each household appliance (30_1~30_*n*) (See FIG. 2).

The DR control unit 20 receives power rate information from the power company through the smartmeter 10, and establishes different DR levels of individual power units using the received power rate information. The established DR level information is transmitted to each household appliance 30.

The DR control unit 20 records power rate information received from the smartmeter 10 at intervals of a unit time. For example, assuming that the unit time is set to one hour, the power rate information is recorded 24 times each day. The DR control unit establishes a plurality of DR levels having different power rates of individual power units on the basis of the highest power rate and the lowest power rate using the power rate information. In this case, each DR level may be represented by power rates for every power unit.

In addition, the DR control unit 20 records power rate information received from the power company through the smartmeter 10 at intervals of a predetermined time (i.e., every unit time), and extracts a power rate pattern using an average power rate for each time zone during a predetermined period. The DR control unit 20 classifies a time interval depending on the power rate pattern into a high-power-rate assessment interval and a low-power-rate assessment interval on the basis of a predetermined power rate limit.

Figure 3:
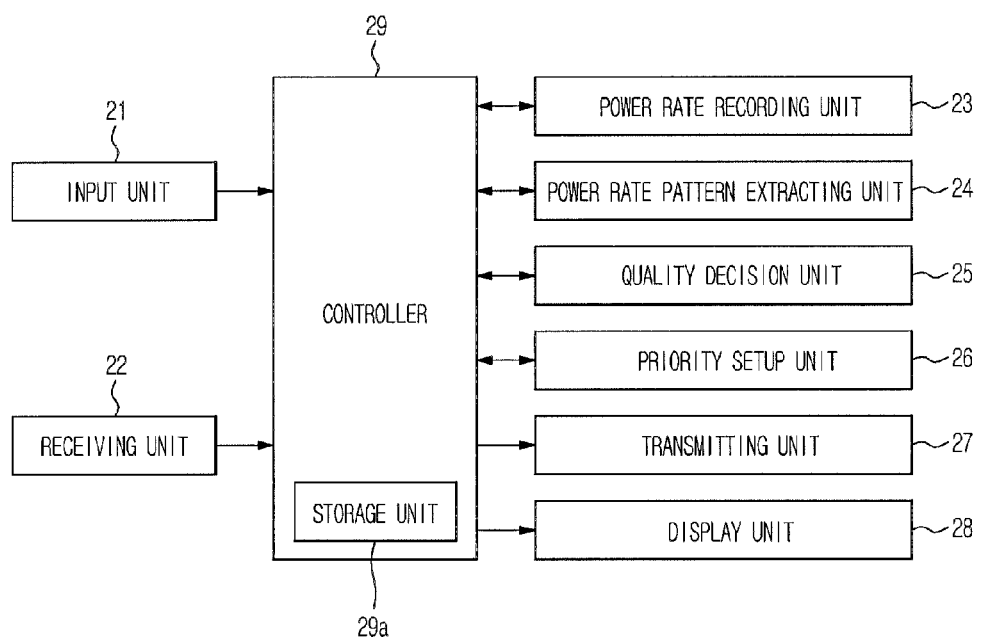
FIG. 3 is a control block diagram illustrating each of the household appliances for use in a DR system according to an embodiment.

FIG. 3 is a control block diagram illustrating each household appliance for use in a DR system according to an embodiment.

Referring to FIG. 3, the DR control unit 20 includes an input unit 21, a receiving unit 22, a power-rate recording unit 23, a power-rate pattern extracting unit 24, a quality decision unit 25, a priority setup unit 26, a transmitting unit 27, a display unit 28 and a controller 29.

The input unit 21, for example, a keypad, a keyboard, a joystick, a touchpad, a button, etc., is used as an interface unit allowing a user to enter a desired command. Specifically, the input unit 21 may be integrated with the display unit 28, and may be configured in the form of a touchscreen.

The receiving unit 22 receives power rate information from the smartmeter 10, and receives various kinds of information from each household appliance (30_1~30_*n*) installed in a home. Specifically, the receiving unit 22 receives a quality factor of each household appliance (30_1~30_*n*) from each household appliance (30_1~30_*n*). The quality factor represents performance of each household appliance as a percentage.

The power rate recording unit 23 records the power rates received from the smartmeter 10 at intervals of a unit time. For example, assuming that the unit time is set to one hour, the power rate values are updated 24 times each day.

The power rate pattern extracting unit 24 extracts the power rate pattern from power rates recorded in the power rate recording unit 23. The electricity demand pattern is denoted by a power rate varying with the lapse of a unit time within a pattern period. The pattern period may be set to any of one day, one week, one month, one year, etc.

In one example for calculating the power rate pattern using power rate data collected over a predetermined time interval, the unit time may be set to one hour and a pattern period may be set to one day. An average of all the daily power date data is calculated for each unit time of the pattern period, such that the power rate pattern is obtained.

For example, the power rate data measured between midnight and 1 o'clock (1 AM) for each day is averaged to obtain the power rate for 1 AM, and the power rate data measured between 1 AM and 2 AM for each day is averaged to obtain the power rate data for 2 AM. In this way, the power rate pattern extracting unit 24 calculates the average power rate for each unit time of the pattern period.

The quality decision unit 25 determines a quality state of each household appliance according to a quality factor of the household appliance.

The priority setup unit 26 establishes the priorities of individual household appliances (30_1~30_*n*) according to quality factors of the household appliances (30_1~30_*n*).

The priority setup unit 26 can establish the priorities of individual household appliances (30_1~30_*n*) on the basis of both the quality state of each household appliance (30_1~30_*n*) and the user-entered priority of each household appliance (30_1~30_*n*).

In addition, the priority setup unit 26 can determine the priority of each household appliance (30_1~30_*n*) on the basis of the quality state of each household appliance (30_1~30_*n*) and the operational importance entered by the user. The operational importance is selected from among predetermined operational importance values predetermined for the priority setting of each household appliance (30_1~30_*n*) by the user. For example, if the operational importance is an average operation time, the priority of one household appliance having a long average operation time may be set to be higher than that of another household appliance having a short average operation time. If the operational importance is power consumption, the priority of the household appliance having high power consumption may be set to be higher than that of another household appliance having low power consumption. In addition, if the operational importance indicates both power consumption and the average operation time, the priority of the household appliance having a long operation time and high power consumption may be set to be higher than that of another household appliance having the short operation time and low power consumption.

The transmitting unit 27 transmits various kinds of information to the individual household appliances 30_1 to 30_*n*.

The display unit 28 may visually indicate operations of the DR control unit 20, or may display a current DR level or a current power rate. In addition, the display unit 28 may display either a screen image for receiving data of the operational importance to establish priorities of individual household appliances (30_1~30_*n*) or a screen image for receiving priorities of individual household appliances (30_1~30_*n*) from the user.

The controller 29 controls the DR control unit 20, such that the controller 29 controls individual elements of the DR control unit 20.

The controller 29 stores information received from the receiving unit 22, stores various kinds of data, and stores target values for various control operations and a control program.

The controller 29 receives information about the daily power rate from the smartmeter 10, and records the received daily power rate information in the power rate recording unit 23.

In addition, the controller 29 calculates an average for each time interval during the predetermined time interval in association with daily power rate information recorded in the power rate recording unit 23 using the power rate pattern extracting unit 24, such that it can extract the power rate pattern.

The controller 29 determines the initial DR level according to power rate information, and transmits the determined DR level to individual household appliances (30_1~30_*n*) through the transmitting unit 27. The received household appliance is operated in response to the initial DR level.

The controller 29 receives the quality factors of individual household appliances (30_1~30_*n*) through the receiving unit 22, and determines a current quality state of each household appliance (30_1~30_*n*) through the quality decision unit 25.

The controller 29 limits the range of an available DR level according to the quality states of individual household appliances (30_1~30_*n*) determined through the quality decision unit 25. That is, while the DR level of a high-quality household appliance can be changed within all ranges in such a manner that the high-quality household appliance can perform the normal operation and a maximum power-saving operation, a low-quality household appliance is controlled to perform only the normal operation without performing the power-saving operation in such a manner that the low-quality household appliance can enable the DR level to have a value corresponding to the normal operation level only. As a result, the quality of household appliance can be guaranteed within an allowable quality-guarantee range and at the same time power consumption can be minimized.

In addition, the controller 29 establishes priorities of individual household appliances (30_1~30_*n*) according to quality states of the individual household appliances (30_1~30_ *n*). If a current power rate is higher than the limit power rate or current power consumption is higher than the limit power consumption, the controller 29 searches for the lowest-priority household appliance among low-DR-level household appliances, and increases a DR level of the lowest-priority household appliance such that the lowest-priority household appliance enters the power-saving operation mode. If a current power rate is less than the limit power rate or current power consumption is less than the limit power consumption, the controller 29 searches for the highest-priority household appliance among high-DR-level household appliances, and reduces a DR level of the highest-priority household appliance such that the degree of the power-saving operation of the highest-priority household appliance is lowered.

The DR control unit 20 for use in the DR system according to an embodiment receives quality status information of each household appliance, and uses the received information to control the DR level. Since the quality of each household appliance can be most accurately determined by each household appliance, the quality status of each household appliance can be determined according to a diagnostic method embedded in each household appliance. The diagnostic method is differently determined according to categories and tendencies of household appliances. Therefore, there is needed a common rule for deciding a quality factor value by deciding a status of each household appliance.

Figure 4:
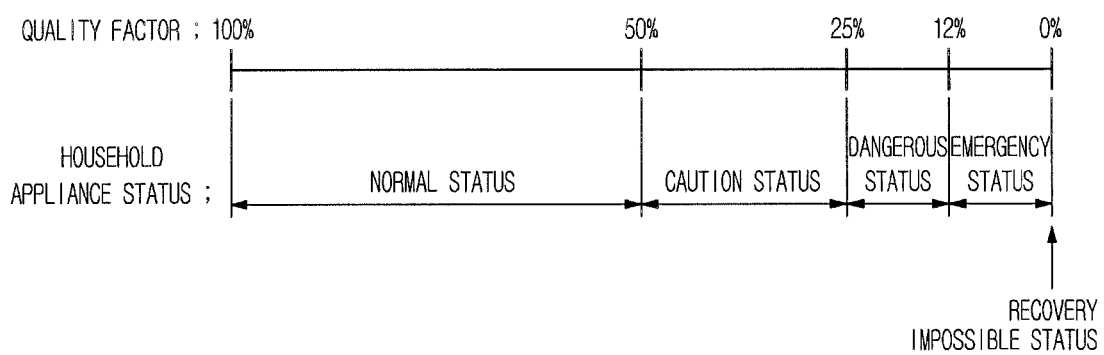
FIG. 4 illustrates a rule for allowing each household appliance to determine a quality factor in a DR system according to an embodiment.

FIG. 4 illustrates a rule for allowing each household appliance to determine a quality factor in a DR system according to an embodiment.

Referring to FIG. 4, a quality factor of more than 51% is used in a normal status, a quality factor of 50%~26% is used in a caution status, a quality factor of 25%~13% is used in a dangerous status, and a quality factor of less than 12% is used in an emergency status.

The emergency status means that one of various devices (such as a sensor, a heater, etc.) has malfunctioned so that an emergency operation is now being performed. A recovery not possible status means that one of the household appliances is unable to perform necessary functions any longer. In the recovery not possible state, the quality factor is set to 0%.

In the DR system according to an embodiment, the DR control unit 20 variably controls a DR level of each household appliance according to a quality status of the household appliance. In addition, the DR control unit 20 compares current power rate with a predetermined limit power rate, or compares current power consumption with a predetermined limit power consumption such that it variably controls a DR level of each household appliance.

A method for allowing the DR control unit 20 to variably control a DR level of the household appliance in response to a quality status of the household appliance will hereinafter be described in detail.

The DR control unit 20 determines an initial DR level in response to current power rate information. Information about the initial DR level is transmitted to each household appliance. Upon receiving the initial DR level information, the household appliance is operated according to the initial DR level.

The DR control unit 20 receives the quality factor from the household appliance, and receives information about a current quality status denoted by a percentage of 0 to 100. In this case, the calculated percentage value may be determined in different formats or scales.

The DR control unit 20 limits the range of the DR level according to quality statuses of individual household appliances. If a household appliance having a low quality status is present, the DR control unit 20 is operated at a low DR level. The lower the DR level, the closer the household appliance performance is to 100%. As a result, the quality status of the household appliance is increased.

If a DR level is unchanged at a low quality status, there is a high possibility of causing problems in the household appliance. If a power saving operation mode of the household appliance is performed at a low quality status, the household appliance is unable to be operated with the performance of 100%, the quality status of the household appliance may not be occasionally recovered. For example, if a defrosting operation of a freezer is delayed for a long period of time, the freezer can accumulate a large amount of frost, at which point the freezer is no longer able to perform the defrosting operation. In this case, if the DR level is adjusted in response to quality status, the aforementioned problem can be solved.

Figure 5:
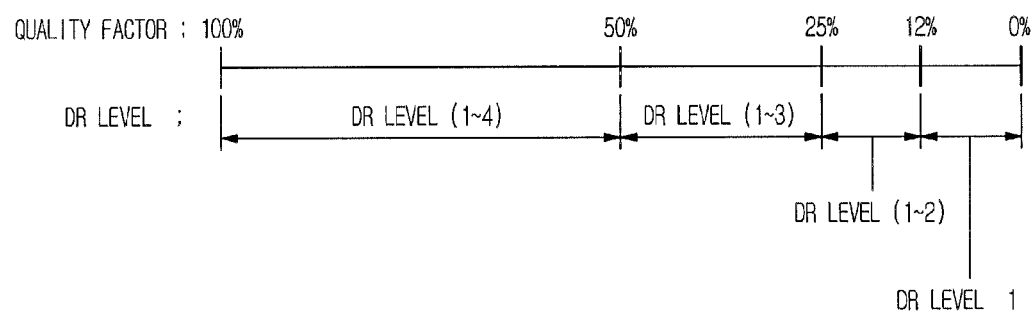
FIG. 5 is a conceptual diagram illustrating a method for limiting a DR level in response to a quality factor in a DR system according to an embodiment.

FIG. 5 is a conceptual diagram illustrating an exemplary method for limiting a DR level in response to a quality factor in a DR system according to an embodiment.

Referring to FIG. 5, if the quality status is in the range of 100%~51%, all DR levels 1~4 may be used. If the quality status is in the range of 50%~26%, DR levels 1 to 3 may be used. If the quality status is in the range of 25%~13%, DR levels 1 and 2 may be used. If the quality status is equal to or less than 12%, the DR system is operated only at a DR level of 1.

The DR level of 1 indicates a normal operation condition, and the DR level 4 indicates a power saving operation condition capable of minimizing power consumption.

In the aforementioned example, the range of a DR level and the condition for limiting a DR level in response to a quality status may be changed.

Provided that the quality status is 30% and the household appliance is operated at a DR level 3, if the quality status of the household appliance is reduced to 20%, the DR level is changed to a DR level 2 according to the DR level limit conditions. If the quality status of the household appliance is reduced to 10%, the DR level is changed to level 1.

A method for allowing the DR control unit 20 to variably control a DR level at a limit power rate or a limit power consumption will hereinafter be described with reference to the annexed drawings.

In the case of controlling the DR level using the limit instantaneous power rate or the limit power consumption, priority is determined according to the quality status of each household appliance, such that DR levels of individual household appliances may be sequentially changed. In this case, the DR levels of the individual household appliances are changed at intervals of a predetermined time, such that the DR level is not abruptly changed.

Figure 6:
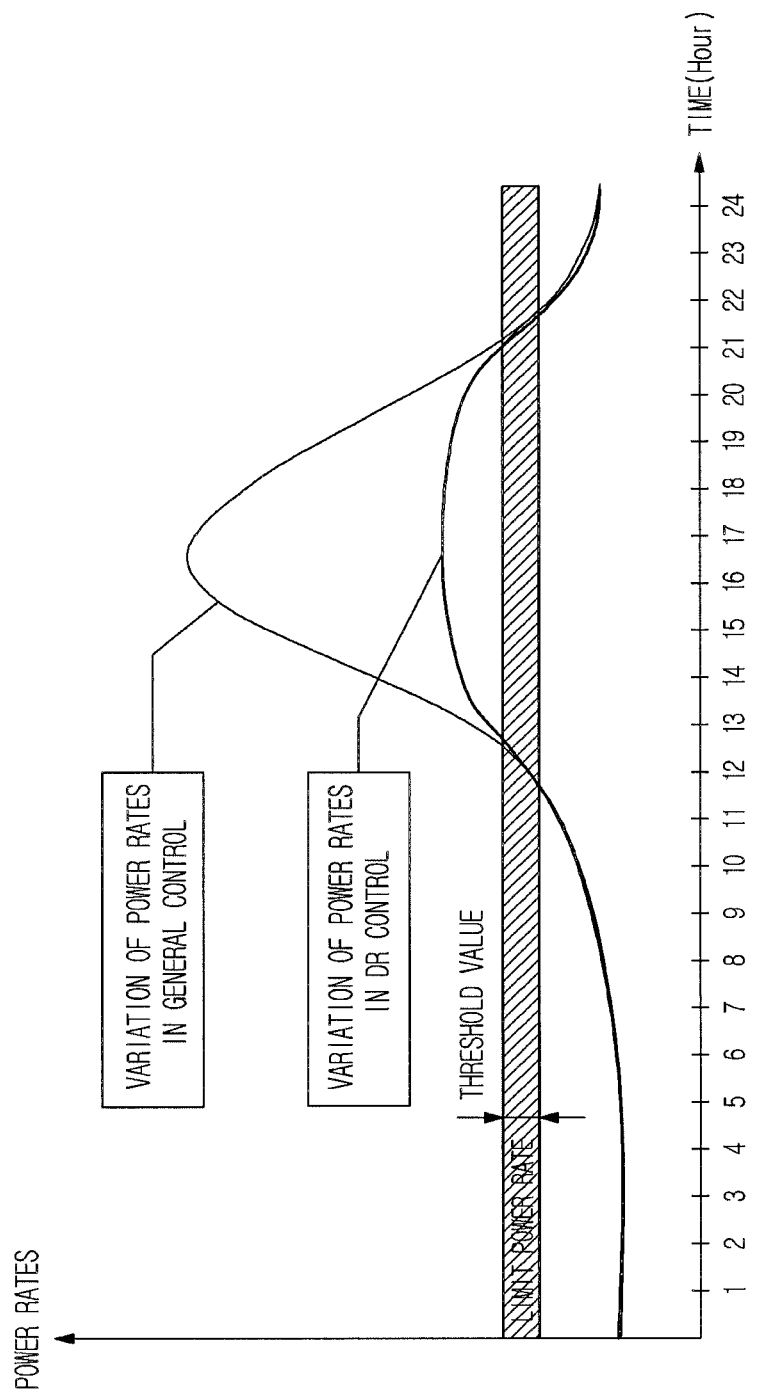
FIG. 6 illustrates variation of power rates when a DR system controls a DR level in response to limit power rates according to an embodiment.

FIG. 6 illustrates variation of power rates when a DR system controls DR level in response to limit power rates according to an embodiment.

If a real-time power rate system is introduced to the DR system, power rates are variably assessed to a user or consumer according to electricity demand. If DR level control is performed in response to a limit power rate so as to reduce the user's electricity bill, the household appliance can be used at a reduced power rate. The limit power rate and a threshold value of the limit power rate may be established by a user.

Figure 7:
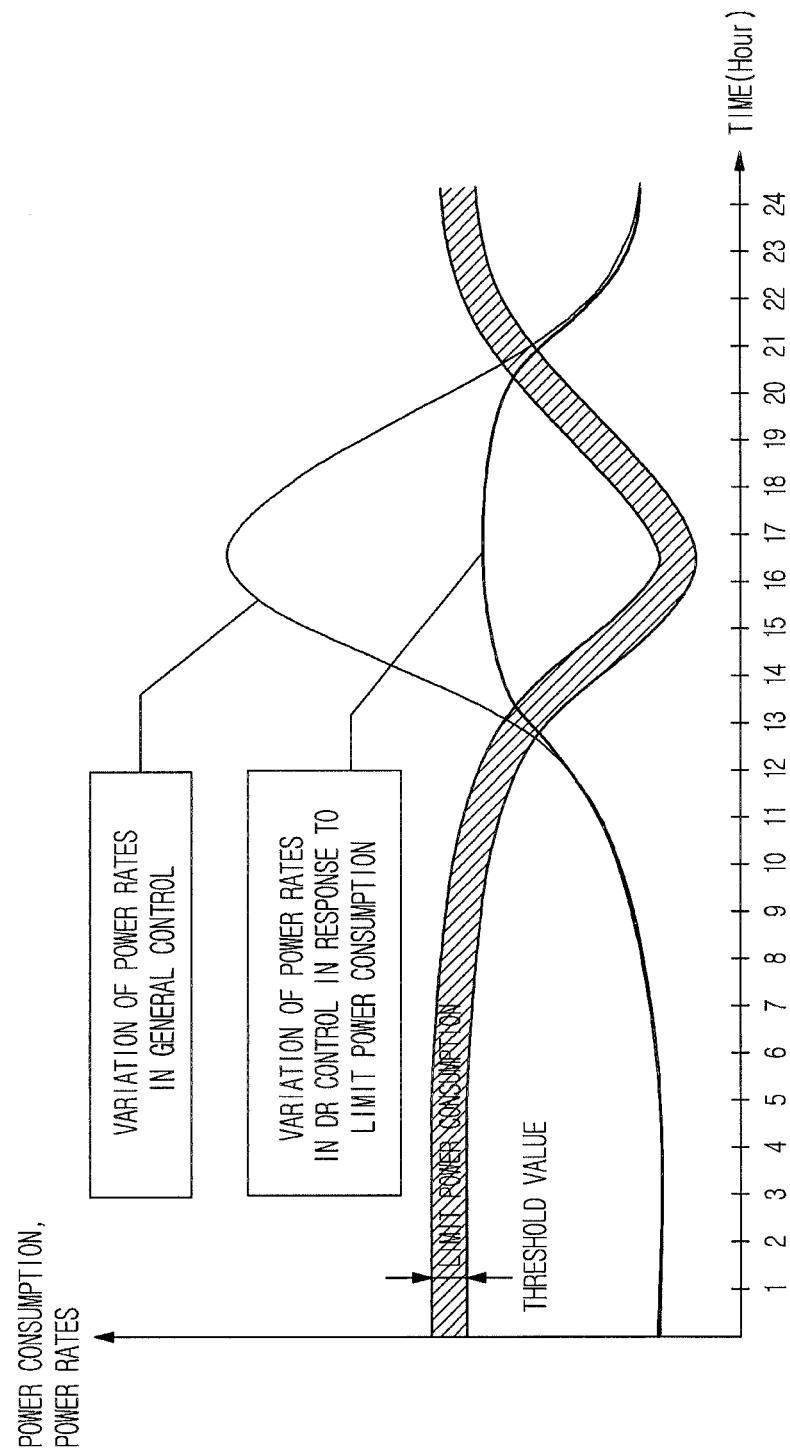
FIG. 7 illustrates variation of power rates when a DR system controls a DR level in response to limit power consumption according to an embodiment.

FIG. 7 illustrates variation of power rates when a DR system controls a DR level in response to limit power consumption according to an embodiment.

If the limit power consumption is established and the DR level is controlled not to exceed the limit power consumption, the household appliance can be used with the reduced power rates. In this case, the limit power consumption may be changed according to power rates, or may be established by a user.

In order to control a DR level, priorities of individual household appliances must be determined. The priorities are established using a quality factor.

FIG. 8 is a table showing priorities depending on quality factors of individual household appliances for use in a DR system according to an embodiment.

Referring to FIG. 8, the priorities of respective household appliances are established according to quality factors. For example, provided that quality factors of a refrigerator, a washing machine, an air-conditioner, a stove (cook-top), and a TV are 10%, 70%, 30%, 80%, and 90%, respectively, the priorities of household appliances are arranged in ascending numerical order of the quality factor, i.e., are arranged in the order of refrigerator→air-conditioner→washing machine→stove (cook-top)→TV.

Meanwhile, the priorities of household appliances are generally determined according to the quality status of each household appliance. However, the user may be required to establish the priority of each household appliance. Provided that the priority of a specific household appliance is set to 0, this household appliance is always operated at a DR level of 1.

If priority changes made by the user are determined to cause an increase in the cost to the consumer for electricity, the DR control unit 20 generates an alarm or warning sound to alert the user to the increased power rates.

In addition, if a user requests immediate operation of a specific household appliance, the quality factor of the specific household appliance must be lowered in such a manner that the priority of the specific household appliance can be increased to the point where the household appliance can be operated immediately. In other words, if the household appliance cannot be normally operated upon receiving the user request, the quality factor must be lowered to prevent user inconvenience.

For example, since a washing machine or a microwave oven is operated for a short period of time, its quality factor must be lowered when a user request is received in such a manner that the washing machine or microwave oven can be immediately and normally operated according to the user request.

A method for controlling a DR level when the limit power rate or the limit power consumption is applied to the household appliance will hereinafter be described in detail.

First, if a current power rate or current power consumption is equal to or higher than the limit power rate or the limit power consumption, the DR level of the lowest-priority household appliance from among a plurality of low-DR-level household appliances is increased by one step.

Second, if a current power rate or current power consumption is less than the limit power rate or the limit power consumption, the DR level of the highest-priority household appliance from among a plurality of low-DR-level household appliances is reduced by one step.

Third, a threshold value for the limit power rate or the limit power consumption is established to prevent a DR level from being abruptly changed.

Fourth, the number of DR level change times may be changed according to variation in power rate or power consumption or a deviation between a current power rate or power consumption and the limit power rate or limit power consumption.

Fifth, the household appliance having the priority of 0 is determined by the user, such that this household appliance is always operated at a DR level of 1.

Figure 9:
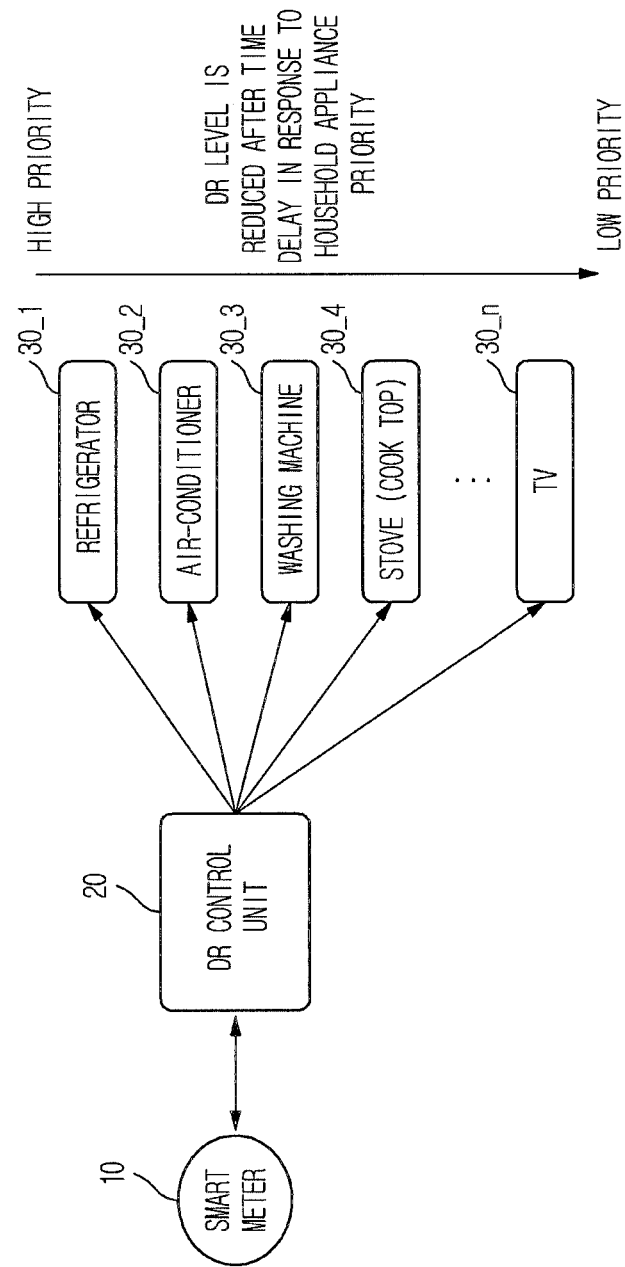
FIG. 9 is a block diagram illustrating a method for controlling a DR system to reduce a DR level in response to the priorities of individual household appliances according to an embodiment.

FIG. 9 is a block diagram illustrating a method for controlling a DR system to reduce a DR level in response to the priorities of individual household appliances according to an embodiment.

If a current power rate is less than the limit power rate or current power consumption is less than the limit power consumption, the DR control unit 20 searches for the highest-priority household appliance among high-DR-level household appliances, and reduces a DR level of the searched household appliance by one step. Operation of the DR control unit 20 is delayed for a predetermined period of time, and the same control operation is repeated.

Figure 10:
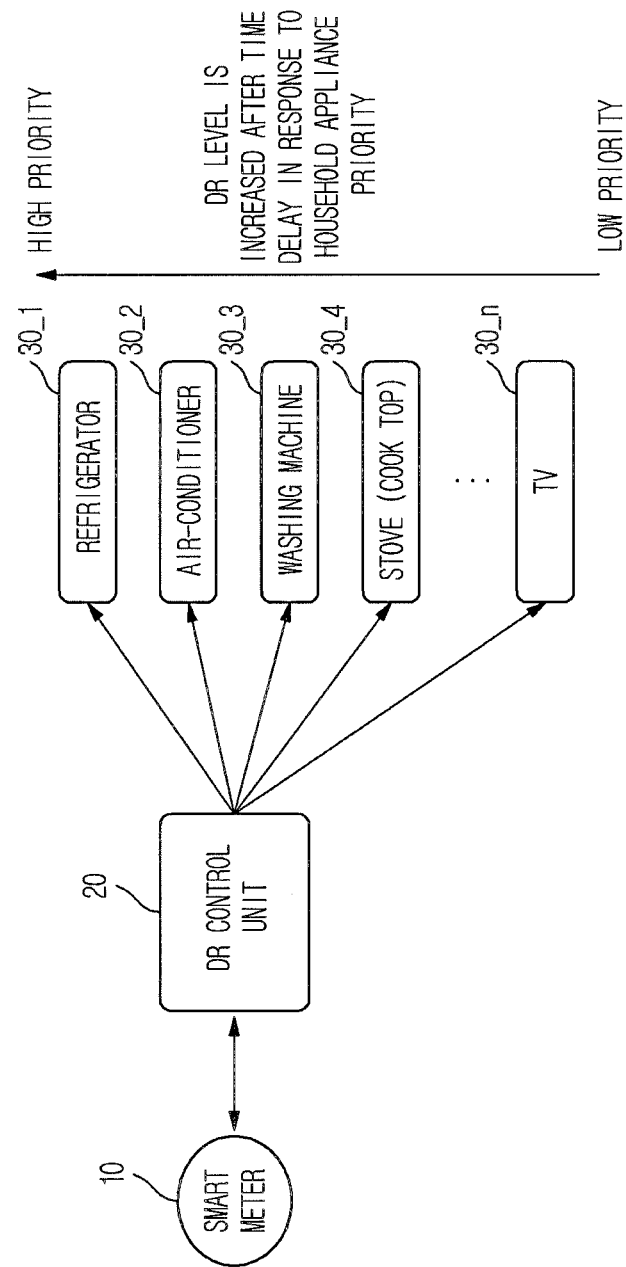
FIG. 10 is a block diagram illustrating a method for controlling a DR system to increase a DR level in response to the priorities of individual household appliances according to an embodiment.

FIG. 10 is a block diagram illustrating a method for controlling a DR system to increase a DR level in response to the priorities of individual household appliances according to an embodiment.

If a current power rate is higher than the limit power rate or current power consumption is higher than the limit power consumption, the DR control unit 20 searches for the lowest-priority household appliance among low-DR-level household appliances, and increases a DR level of the lowest-priority household appliance by one step. Operation of the DR control unit 20 is delayed for a predetermined period of time, and the same control operation is repeated.

If DR levels of all household appliances are simultaneously reduced, loads delayed when a DR level is high are also simultaneously operated. As shown in FIGS. 9 and 10, when different time delays are assigned according to individual situations or individual priorities and the DR levels are sequentially changed, the power consumption can be easily managed.

The DR control unit 20 for use in the DR system according to an embodiment controls a DR level of each household appliance using the following two methods.

The first method variably controls a DR level of each household appliance according to the quality status of the household appliance. In the case of setting the DR level to an initial DR level or lowering the limit power rate or the limit power consumption, the first method can limit the DR level range according to the quality factor.

The second method compares a current power rate with a predetermined limit power rate, or compares current power consumption with a predetermined limit power consumption, such that it can variably control the DR level of the household appliance. The second method establishes the limit power rate or the limit power consumption, and determines the priority of each household appliance according to the quality factor, such that a DR level of each household appliance can be adjusted.

The first method and the second method may be simultaneously applied in the present embodiments.

Methods for allowing the DR control unit 20 of the DR system to control a refrigerator, a washing machine, and an air-conditioner using the aforementioned two DR level control methods according to an embodiment will hereinafter be described in detail.

The quality status of the refrigerator may be affected by the defrosting operation.

If the quality factor of the refrigerator is high, the priority of the refrigerator is low, causing the defrosting operation to be delayed. The longer the defrosting delay time, the lower the quality factor. If the defrosting delay time reaches a limit delay time, the quality factor is dramatically reduced. If the quality factor is reduced, the priority is increased. Accordingly, the defrosting delay operation is completed and the defrosting operation can be performed.

After performing the defrosting operation, the quality factor is increased again, and the power saving operation mode is performed again.

Provided that only the second method is applied to the DR level control, the defrosting operation may be continuously delayed by limiting the limit power rate/power consumption although the priority is increased.

In this case, provided that the first method is applied, the defrosting operation can be performed by the DR level limitation function based on the quality factor. That is, if the DR level is reduced by the DR level limitation function, the defrosting operation is performed, and power rates and the power consumption exceed their limit points. As a result, the DR level of the remaining household appliances other than the refrigerator can be reduced by the second method.

For example, an additional button capable of determining the immediate operation or the power saving operation may be applied to the washing machine.

In the immediate operation mode, the washing function is immediately performed although the power rates are high. In the power saving operation mode, the quality factor is gradually reduced according to whether the washing start time is delayed or not.

The reason why the quality factor is gradually reduced is to prepare for an exemplary case in which the washing function is not performed after the lapse of one day (24 hours) due to low priority assigned to the washing machine.

A time delay may be encountered before the desired operation is performed after the user enters a command signal, such that the quality factor may be affected by this time delay.

If the washing delay time is extended, the quality factor is lowered whereas the priority is increased, such that the washing machine can perform the washing function. Alternatively, if the overall initial DR level is lowered, the washing function may also be performed.

The washing machine may perform not only the DR level range limitation function in response to the quality factor but also the DR level change in response to priority information.

In the case of the air-conditioner, deviation between the room temperature and the set temperature may affect the quality factor of the air-conditioner.

If the deviation between the room temperature and the set temperature is increased, the quality factor is reduced whereas the priority is increased.

In this case, if the difference between the room temperature and the set temperature is reduced due to the increased operation rate of the air-conditioner, the quality factor is increased, the priority is reduced, and the air-conditioner is operated at a low operation rate, such that the air-conditioner is operated in the power saving operation mode.

The aforementioned two DR level control methods are simultaneously applied to the air-conditioner, such that the DR level is changed.

Figure 11:
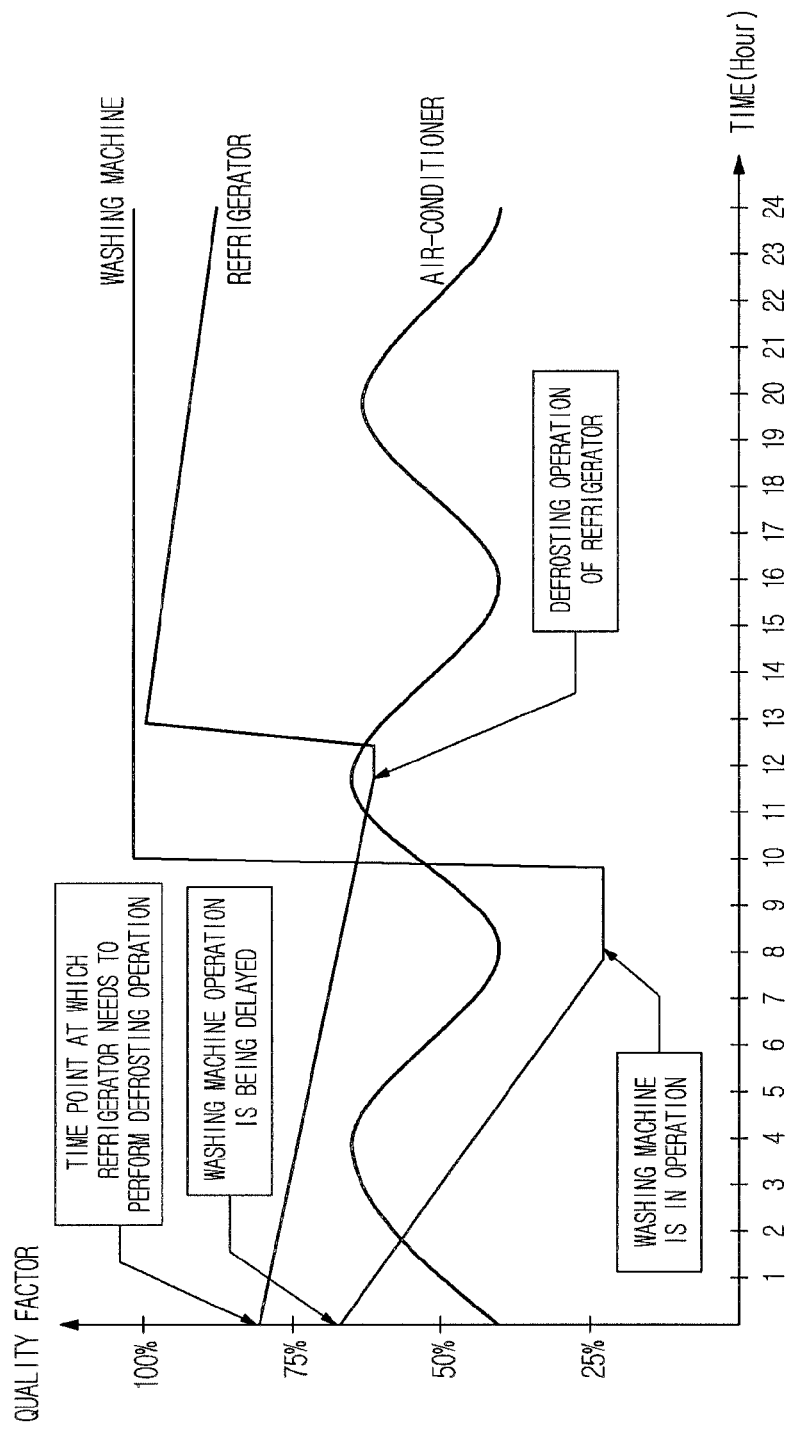
FIG. 11 shows that quality factors of each household appliance for use in a DR system are changed with time according to an embodiment.

FIG. 11 shows that quality factors of each household appliance (e.g., a refrigerator, a washing machine, an air-conditioner, etc.) for use in a DR system are changed with time according to an embodiment.

As shown in FIG. 11, the quality factor of the refrigerator is gradually lowered in proportion to a time delay of the defrosting operation.

The quality factor is lowered so that the priority is increased and the defrosting operation is performed by the DR level range limitation function. After completion of the defrosting operation, the quality factor is abruptly increased.

FIG. 11 shows how the defrosting operation is performed according to priority information varying with the quality factor. Assuming that the current power rates or the current power consumption are lower than the limit power rates or the limit power consumption and the defrosting operation is performed when a DR level of 2 is shifted to a DR level of 1, the refrigerator has the highest priority so that the DR level 1 is assigned to the refrigerator. As a result, the defrosting operation can be performed by the refrigerator.

If the washing machine is operated in the power saving operation mode, the quality factor of the washing machine is gradually reduced in proportion to the delayed time. If the washing machine stops operation, the quality factor of the washing machine is increased.

FIG. 11 shows an exemplary case in which the function for limiting the DR level range is performed according to the quality factor. If the quality factor of the washing machine is reduced to 25% or less, the DR level adjusting range is limited to the range from the DR level 1 to the DR level 2. Assuming that the washing machine begins to operate at the DR level of 2 or less, if the quality factor is set to 25% or less, the washing machine unconditionally performs the washing function.

As can be seen from FIG. 11, the quality factor of the air-conditioner is changed in response to deviation between a current room temperature and a target temperature.

The DR control unit 20 using the quality factor determines priority information in response to quality status variation and determines the DR level change order in response to the determined priority information. In addition, the DR level of the low-quality household appliance is adjusted to be low, so that the quality management and the power saving operation mode of the corresponding household appliance can be achieved.

The quality factor may indicate a quality status of each household appliance and the quality status of each household appliance is always changing.

When adjusting the DR level using the quality status, maximum energy saving effects can be obtained within the range of guaranteeing the household appliance quality.

As described above, if the power saving operation of the household appliance is performed in response to the DR level, power consumption can be reduced when the power or electricity demand is high, so that power rates can be greatly reduced in the real-time power rate system.

In addition, if the power saving operation is excessively applied to the household appliance, the quality of the household appliance may be affected. As such, the DR system according to an embodiment receives the quality status information of each household appliance to determine the priority, and adjusts a DR level of each household appliance, such that it can minimize power consumption within the quality-guaranteed range.

In addition, the time delay is used according to the priority when the DR level is changed, such that it can prevent power consumption from being abruptly changed, resulting in the implementation of stable power management.

Figure 12:
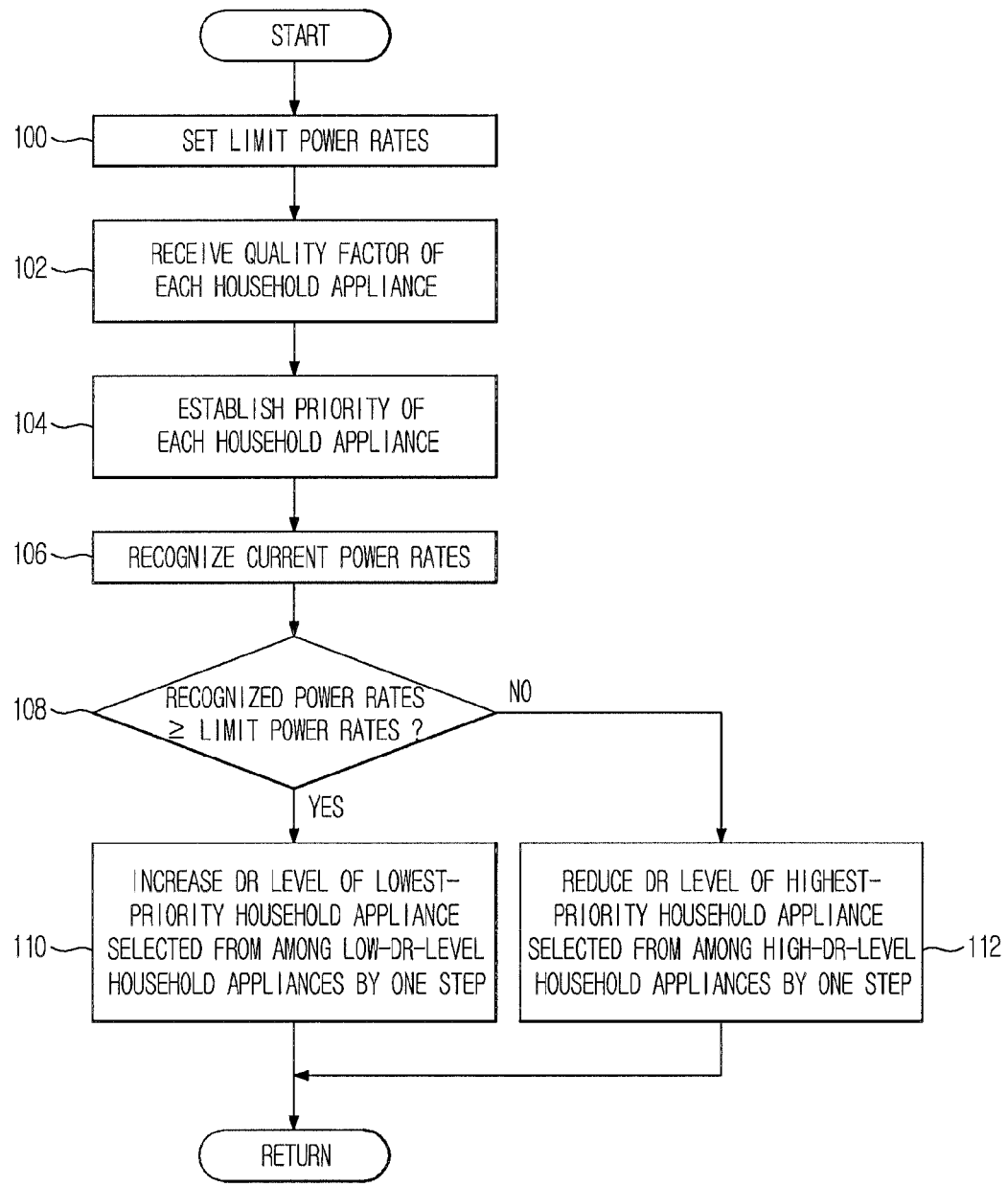
FIG. 12 is a flowchart illustrating a DR method according to an embodiment.

FIG. 12 is a flowchart illustrating a DR method according to an embodiment.

Referring to FIG. 12, the DR control unit 20 establishes the limit power rate at operation 100.

The DR control unit 20 receives the quality factor of each household appliance at operation 102.

Upon receiving the quality factor of each household appliance, the DR control unit 20 establishes the priority of each household appliance at operation 104. In this case, the DR control unit 20 determines priorities of individual household appliances (30_1~30_n) according to the quality states of the household appliances (30_1~30_n).

The DR control unit 20 can establish the priorities of the household appliances (30_1~30_n) on the basis of the operational importance information (e.g., quality state, average operation time, power consumption, etc.) of the household appliances (30_1~30_n). For example, if the operational importance is an average operation time, the priority of one household appliance having a long average operation time may be established to be higher than that of another household appliance having a short average operation time. If the operational importance is based upon power consumption, the priority of the household appliance having high power consumption may be established to be higher than that of another household appliance having low power consumption. In addition, if the operational importance indicates both power consumption and the average operation time, the priority of the household appliance having a long operation time and high power consumption may be established to be higher than that of another household appliance having the short operation time and low power consumption.

Figure 13:
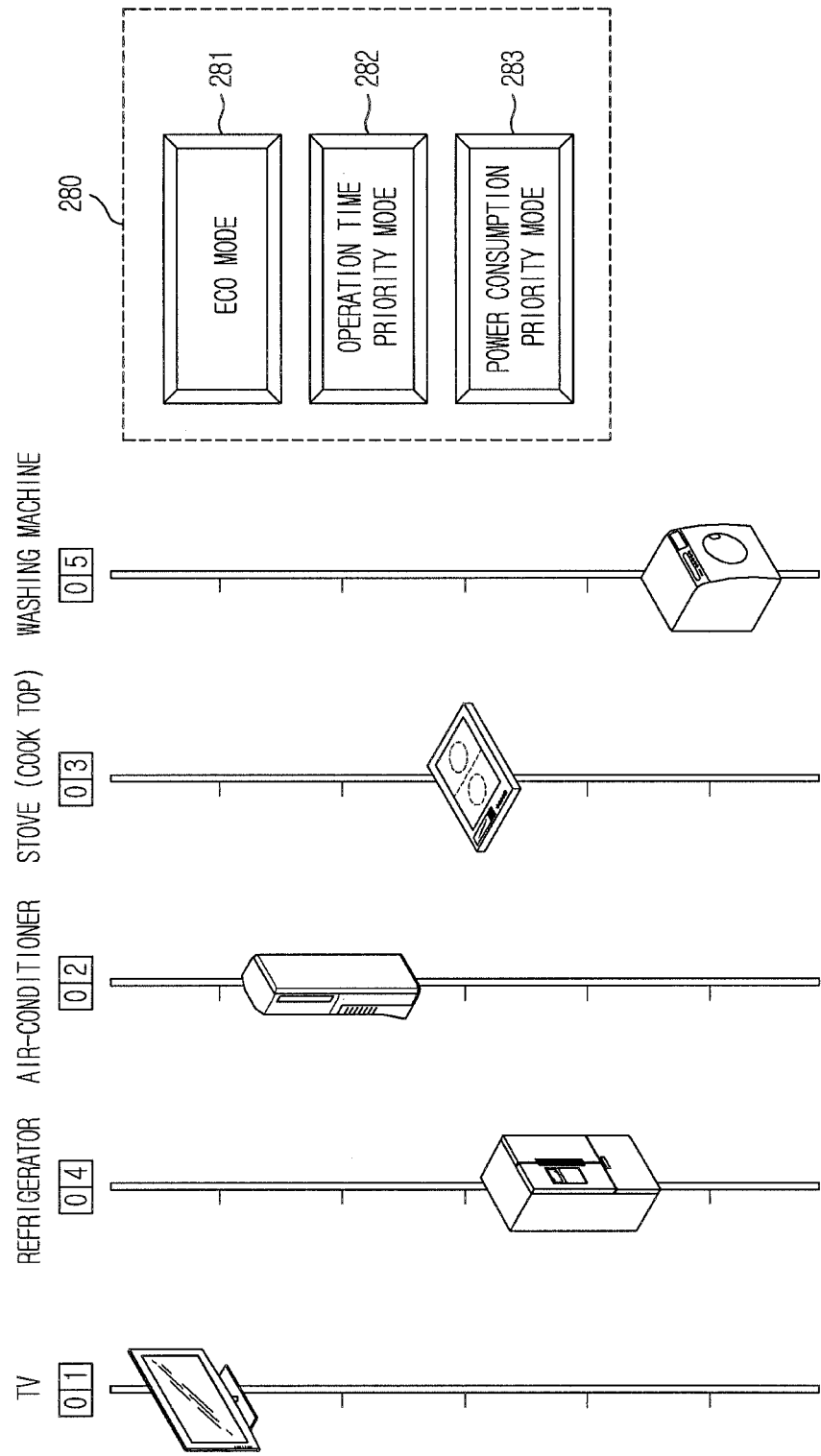
FIG. 13 is a conceptual diagram illustrating priorities of respective household appliances for use in a DR system.

The operation for enabling the user to select the operational importance will hereinafter be described with reference to FIG. 13. In order to select the operational importance, the user selects any one of an economy (ECO) mode button 281, an operation-time priority mode button 282, and a power-consumption priority mode button 283 that are contained in the mode selection button unit 280. That is, according to the concept of FIG. 13, the operational importance is established according to a given reference condition instead of being separately assigned by the user. In this case, the selection and reflection of the operational importance are simultaneously achieved through the aforementioned operation.

If the user selects the ECO mode button 281, the DR method according to embodiments performs distribution of the operational importance in such a manner that energy consumption can be minimized in consideration of both the use of power consumption and the operation time information of each household appliance. If the high operational importance is established, the possibility of reserving the operation of the corresponding household appliance at a user desired time irrespective of power rates (or electricity bills) is increased, and it is difficult to reduce power consumption (or electricity bills). Therefore, in case of the ECO operation mode, the DR method according to the present embodiments assigns a specific value capable of minimizing the operational importance and user inconvenience to the ECO operation mode.

If the user selects the operation time priority mode button 282, the high operational importance is distributed to household appliances each having a long average operation time. Such household appliances (e.g., household appliances that are constantly operated) each having a long average operation time may include a plurality of household appliances directly associated with food, clothing and shelter. Therefore, the DR method according to the present embodiments calculates an average operation time, and performs distribution of the operational importance according to a predetermined range.

If the user selects the power consumption priority mode button 283, the high operational importance is distributed to household appliances each exhibiting high power consumption. In addition, a recommended mode considering the user pattern may be added or a method for enabling the user to store each set value may also be used as necessary.

Referring back to FIG. 12, after recognizing the current power rate, the DR control unit 20 compares the current power rate with the limit power rate established at operation 100, and determines whether the current power rate is higher than the limit power rate at operation 106.

If the current power rate is higher than the limit power rate at operation 108, the DR control unit 20 searches for the household appliance having the lowest priority from among low-DR-level household appliances, and increases a DR level of the lowest priority household appliance by one step at operation 110. The DR control unit 20 returns to operation 102 after a predetermined delay, such that it repeats the same control process.

In the meantime, if the current power rate is less than the limit power rate at operation 108, the DR control unit 20 searches for one household appliance having the highest priority from among high-DR-level household appliances, and reduces a DR level of the searched household appliance by one step at operation 112. The DR control unit 20 returns to operation 102 after the lapse of a predetermined time delay, such that it repeats the same control process.

As is apparent from the above description, the DR system or method according to the embodiment recognizes the quality of a household appliance, determines priority of the household appliance in response to the recognized quality status, and changes a DR level of the household appliance in response to the determined priority, such that the household-appliance quality can be guaranteed in an allowable guarantee range and power consumption can also be minimized.

The methods according to the above-described example embodiments may be recorded in non-transitory computer-readable media or processor-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of computer-readable media or processor-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer or processor using an interpreter. The methods described herein may be executed on a general purpose computer or processor or may be executed on a particular machine such as the demand response system and the demand response method described herein.

The described hardware units may also be configured to act as one or more software modules in order to perform the operations of the above-described embodiments. Any one or more of the software modules described herein may be executed by a dedicated processor unique to that unit or by a processor common to one or more of the modules.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A demand response (DR) method comprising:
   recognizing a demand response level established in each household appliance, the demand response limiting a function of the each household appliance;
   determining a quality status of the each household appliance;
   establishing priority information of the each household appliance in response to the determined quality status;
   determining, if the demand response level established in the each household appliance needs to be changed, a household appliance having a demand response level to be changed according to the priority information and the recognized demand response level of the each household appliance; and
   changing a demand response level established in the determined household appliance,
   wherein a changeable range of the demand response level of the each household appliance is limited by the determined quality status,
   wherein the quality status is determined as one of a plurality of quality statuses that each respectively correspond to a different range between a predetermined range, and
   the changeable range of the demand response level is predetermined to be reduced in proportion to a lowering from one of the plurality of quality statuses to another of the plurality of quality statuses.

2. The DR method according to claim 1, wherein the establishing of the priority information includes establishing priority information of the each household appliance on a basis of the quality status of the each household appliance and at least one of an average operation time or power consumption of the each household appliance.

3. The DR method according to claim 2, wherein the establishing of the priority information includes setting priority information of a household appliance having a first average operation time or a first power consumption to be higher than that of another household appliance having a second average operation time or a second power consumption.

4. The DR method according to claim 2, wherein the establishing of the priority information includes receiving information about the quality status of the each household appliance from a user, and at the same time receiving information indicating whether an item used for priority of the each household appliance is either of the average operation time and the power consumption or both the average operation time and the power consumption.

5. The DR method according to claim 1, wherein the establishing of the priority information includes increasing priority in inverse proportion to the quality status.

6. The DR method according to claim 1, wherein the determining of the quality status includes:
   receiving a quality factor indicating performance of the each household appliance, and determining a quality status of the each household appliance in response to the received quality factor.

7. The DR method according to claim 1, wherein the plurality of quality statuses include a normal status, a caution status, a dangerous status, and an emergency status.

8. The DR method according to claim 1, wherein the plurality of quality statuses each respectively corresponds to a different percentage range between 0 percent to 100 percent.

9. A demand response (DR) method comprising:
   recognizing a demand response level established in each household appliance, the demand response limiting a function of the each household appliance;
   determining a quality status of the each household appliance;
   establishing priority information of the each household appliance in response to the determined quality status;
   determining, if the demand response level established in the each household appliance needs to be changed, a household appliance having a demand response level to be changed according to the priority information and the recognized demand response level of the each household appliance; and changing a demand response level established in the determined household appliance, wherein a changeable range of the demand response level of the each household appliance is limited by the determined quality status, wherein the determining of the household appliance includes:

recognizing a current power rate, comparing the recognized power rate with a predetermined power rate, searching for one household appliance having a lowest priority from among low-DR-level household appliances if the current power rate is higher than the predetermined power rate, and determining the searched household appliance to be a household appliance having a demand response level to be changed.

10. The DR method according to claim 9, wherein the changing of the demand response level includes:

increasing a demand response level established in the determined household appliance by one step to further limit a function of the determined household appliance.

11. A demand response (DR) method comprising:

recognizing a demand response level established in each household appliance, the demand response limiting a function of the each household appliance;

determining a quality status of the each household appliance;

establishing priority information of the each household appliance in response to the determined quality status;

determining, if the demand response level established in the each household appliance needs to be changed, a household appliance having a demand response level to be changed according to the priority information and the recognized demand response level of the each household appliance; and changing a demand response level established in the determined household appliance, wherein the determining of the household appliance includes:

recognizing a current power rate, comparing the recognized power rate with a predetermined power rate, searching for one household appliance having a highest priority from among high-DR-level household appliances if the current power rate is lower than the predetermined power rate, and determining the searched household appliance to be a household appliance having a demand response level to be changed.

12. The DR method according to claim 11, wherein the changing of the demand response level includes:

reducing a demand response level established in the determined household appliance by one step to partially release a limited function of the determined household appliance.

13. A demand response (DR) method comprising:

recognizing a demand response level established in each household appliance, the demand response limiting a function of the each household appliance;

determining a quality status of the each household appliance;

establishing priority information of the each household appliance in response to the determined quality status;

determining, if the demand response level established in the each household appliance needs to be changed, a household appliance having a demand response level to be changed according to the priority information and the recognized demand response level of the each household appliance; and changing a demand response level established in the determined household appliance, wherein a changeable range of the demand response level of the each household appliance is limited by the determined quality status, further comprising:

determining whether the quality status of the each household appliance is less than a predetermined level, and changing, if there is a specific household appliance having the quality status of less than the predetermined level, a demand response level of the specific household appliance to a value of a normal operation level.

14. A demand response (DR) system comprising:

a receiving unit to receive a quality factor of a plurality of household appliances, the demand response limiting a function of the plurality of household appliances;

a quality decision unit to determine a quality status of each of the plurality of household appliance in response to the received quality factor of each of the plurality of household appliance;

a priority setup unit to establish priority information of each of the plurality of household appliance on a basis of the determined quality status of each of the plurality of household appliance; and a controller to determine, if the demand response level established in the plurality of household appliance needs to be changed to limit a function of each of the plurality of household appliance, a household appliance having a demand response level to be changed according to priority information and a current demand response level of each of the plurality of household appliance, and to change a demand response level established in the determined household appliance, wherein a changeable range of the demand response level is limited by the quality status, wherein the quality status is determined as one of a plurality of quality statuses that each respectively correspond to a different range between a predetermined range and the changeable range of the demand response level is predetermined to be reduced in proportion to a lowering from one of the plurality of quality statuses to another of the plurality of quality statuses.

15. The DR system according to claim 14, wherein the priority setup unit establishes priority information of each of the plurality of household appliance on a basis of the quality status of each of the plurality of household appliance and at least one of an average operation time or power consumption of each of the plurality of household appliance.

16. The DR system according to claim 14, wherein the priority setup unit includes establishing priority information of a household appliance having any of a low quality status, a first average operation time or a first power consumption to be higher than that of another household appliance having any of a high quality status, a second average operation time or a second power consumption.

17. A demand response system (DR) comprising:

a receiving unit to receive a quality factor of a plurality of household appliances, the demand response limiting a function of the plurality of household appliances;

a quality decision unit to determine a quality status of each of the plurality of household appliance in response to the received quality factor of each of the plurality of household appliance;

19 a priority setup unit to establish priority information of each of the plurality of household appliance on a basis of the determined quality status of each of the plurality of household appliance; and a controller to determine, if a demand response level established in the plurality of household appliance needs to be changed to limit a function of each of the plurality of household appliance, a household appliance having a demand response level to be changed according to priority information and a current demand response level of each of the plurality of household appliance, and to change a demand response level established in the determined household appliance, wherein a changeable range of the demand response level is limited by the quality status, wherein the controller determines whether the quality status of each of the plurality of household appliance is less than a predetermined level, and changes, if there is a specific household appliance having the quality status of less than the predetermined level, a demand response level of the specific household appliance to a value of a normal operation level.

18. A demand response system (DR) comprising:

a receiving unit to receive a quality factor of a plurality of household appliances, the demand response limiting a function of the plurality of household appliances;

a quality decision unit to determine a quality status of each of the plurality of household appliance in response to the received quality factor of each of the plurality of household appliance;

a priority setup unit to establish priority information of each of the plurality of household appliance on a basis of the determined quality status of each of the plurality of household appliance; and a controller to determine, if a demand response level established in the plurality of household appliance needs to be changed to limit a function of each of the plurality of household appliance, a household appliance having a demand response level to be changed according to priority information and a current demand response level of each of the plurality of household appliance, and to change a demand response level established in the determined household appliance, wherein a changeable range of the demand response level is limited by the quality status, wherein the controller recognizes a current power rate, compares the recognized power rate with a predetermined power rate, searches for one household appliance having a lowest priority from among low-DR-level household appliances if the current power rate is higher than the predetermined power rate, determines the searched household appliance to be a household appliance having a demand response level to be changed, and increases a demand response level of the determined household appliance by one step.

19. A demand response system (DR) comprising:

a receiving unit to receive a quality factor of a plurality of household appliances, the demand response limiting a function of the plurality of household appliances;

a quality decision unit to determine a quality status of each of the plurality of household appliance in response to the received quality factor of each of the plurality of household appliance;

a priority setup unit to establish priority information of each of the plurality of household appliance on a basis of the determined quality status of each of the plurality of household appliance; and

20 a controller to determine, if a demand response level established in the plurality of household appliance needs to be changed to limit a function of each of the plurality of household appliance, a household appliance having a demand response level to be changed according to priority information and a current demand response level of each of the plurality of household appliance, and to change a demand response level established in the determined household appliance, wherein a changeable range of the demand response level is limited by the quality status, wherein the controller recognizes a current power rate, compares the recognized power rate with a predetermined power rate, searches for one household appliance having a highest priority from among high-DR-level household appliances if the current power rate is lower than the predetermined power rate, determines the searched household appliance to be a household appliance having a demand response level to be changed, and reduces a demand response level of the determined household appliance by one step to partially release a limited function of the determined household appliance.

20. A demand response (DR) method comprising:

establishing a demand response level, the demand response limiting a function of a household appliance;

determining a quality status of the household appliance in which the demand response level is established;

determining a changeable range of the demand response level of the household appliance in response to the determined quality status; and changing, if the demand response level established in the household appliance needs to be changed, the demand response level established in the household appliance on a basis of the determined changeable range of the demand response, wherein the quality status is determined as one of a plurality of quality statuses that each respectively correspond to a different range between a predetermined range, and the changeable range of the demand response level is predetermined to be reduced in proportion to a lowering from one of the plurality of quality statuses to another of the plurality of quality statuses.

21. A demand response (DR) method comprising:

operating a plurality of household appliances at an initial demand response level;

determining a quality status of each household appliance being operated at the initial demand response level;

establishing priority information of each household appliance in response to the determined quality status;

recognizing a current power rate of each household appliance;

comparing the recognized power rate with a predetermined power rate;

searching for a household appliance having a highest priority from among high-DR-level household appliances if the current power rate is lower than the predetermined power rate, determining the searched household appliance to be a household appliance having a demand response level to be changed, searching for a household appliance having a lowest priority from among low-DR-level household appliances if the current power rate is higher than the predetermined power rate, and determining the searched household appliance to be a household appliance having a demand response level to be changed; and reducing, if the household appliance having the demand response level to be changed is a household appliance having the highest priority from among high-DR-level household appliances, a demand response level of the determined household appliance to partially release the demand response level, and increasing, if the household appliance having the demand response level to be changed is a household appliance having the lowest priority from among low-DR-level household appliances, a demand response level of the determined household appliance to further limit a function of the determined household appliance.

22. A demand response (DR) method comprising:
determining a priority of each household appliance in response to a quality status of the each household appliance; and
variably controlling a demand response level of the each household appliance according to the priority of each household appliance, to maintain quality of the household appliance and to minimize power consumption of the household appliance,
wherein a changeable range of the demand response level is limited by the quality status,
wherein the quality status is determined as one of a plurality of quality statuses that each respectively correspond to a different range between a predetermined range, and
the changeable range of the demand response level is predetermined to be reduced in proportion to a lowering from one of the plurality of quality statuses to another of the plurality of quality statuses.

23. A demand response (DR) system comprising:
a smartmeter to, receive power rate or power consumption data from a power company; and
a demand response controller, coupled to the smartmeter, to receive a quality factor of a plurality of household appliances, to determine a quality status of each household appliance in response to the received quality factor of each household appliance, to establish priority information of each household appliance on a basis of the determined quality status of each household appliance, and to set a demand response level in the determined household appliance,
wherein a changeable range of the demand response level is limited by the quality status,
wherein the quality status is determined as one of a plurality of quality statuses that each respectively correspond to a different range between a predetermined range, and
the changeable range of the demand response level is predetermined to be reduced in proportion to a lowering from one of the plurality of quality statuses to another of the plurality of quality statuses.

24. A non-transitory computer-readable medium comprising a program for instructing a computer to perform the method of claim 22.

* * * * *

UNITED STATES PATENT AND TRADEMARK OFFICE
CERTIFICATE OF CORRECTION

PATENT NO.         : 8,914,160 B2
APPLICATION NO.    : 13/082875
DATED              : December 16, 2014
INVENTOR(S)        : Jang Beom Yang et al.

It is certified that error appears in the above-identified patent and that said Letters Patent is hereby corrected as shown below:

In the Claims

Claim 23, Column 22, Line 4:

Delete "smartmeter to," and insert --smartmeter to--, therefor.

Signed and Sealed this
Thirtieth Day of June, 2015

Michelle K. Lee
*Director of the United States Patent and Trademark Office*